United States Patent [19]

Kawazoe

[11] 4,271,376
[45] Jun. 2, 1981

[54] ELECTRONIC FLASH

[75] Inventor: Mitsuo Kawazoe, Hachioji, Japan

[73] Assignee: Olympus Optical Co., Ltd., Tokyo, Japan

[21] Appl. No.: 67,541

[22] Filed: Aug. 17, 1979

[30] Foreign Application Priority Data

Sep. 15, 1978 [JP] Japan ............................. 53/112963

[51] Int. Cl.³ .................................... H05B 41/32
[52] U.S. Cl. ......................... 315/241 P; 235/64.7; 354/35; 354/289; 362/5
[58] Field of Search ............... 315/151, 241 P; 362/4, 362/5, 7; 354/35, 128, 145, 289; 235/64.7

[56] References Cited

U.S. PATENT DOCUMENTS

| | | | |
|---|---|---|---|
| 3,742,824 | 7/1973 | Ueda et al. | 354/289 |
| 3,956,763 | 5/1976 | Yamanaka | 354/289 |
| 4,067,024 | 1/1978 | Quinn | 235/64.7 X |
| 4,080,612 | 3/1978 | Maitani et al. | 354/289 X |
| 4,205,908 | 3/1980 | Quinn et al. | 354/35 X |

Primary Examiner—Eugene R. LaRoche
Attorney, Agent, or Firm—Weinstein & Sutton

[57] ABSTRACT

An improved electronic flash is provided having a selectively energizable source of illumination, control circuits for controlling the source of illumination according to a plurality of operational modes which include an automatic control mode and a manual control mode and a housing enclosing the source of illumination and the control circuits. According to a preferred embodiment of the instant invention, a frame is mounted upon an outer surface of the housing and an indicator panel may be removably mounted within the frame. The indicator panel is provided with front and rear surfaces and may be selectively mounted within the frame to externally expose either the front or rear surface thereof. One of the front or rear surfaces is provided with indicia for calculating a diaphragm value.

15 Claims, 16 Drawing Figures

ELECTRONIC FLASH

BACKGROUND OF THE INVENTION

The invention relates to an electronic flash, and more particularly, to an electronic flash having a number of illumination modes including automatic and manual control modes.

An electronic flash for use with a camera is known which is capable of producing illumination in a number of control modes including TTL (through the lens) automatic mode, usual forms of automatic illumination control modes and manual mode. Specifically, a TTL automatic illumination control mode employs direct photometry of TTL type in which an electronic flash is mounted on a single lens reflex camera including an electrical shutter so that reflective light from an object being photographed, which is illuminated by radiation from the electronic flash, is subject to photometry within the camera to produce a signal when proper exposure is reached to interrupt the illumination in an automatic manner, while simultaneously closing the shutter of the camera. In short, this mode provides an automatic control of illumination from the electronic flash by utilizing photometric means which is provided as part of the camera. The usual form of automatic illumination control modes utilize a photometric device which is provided as part of the electronic flash. This photometric device determines reflective light from an object being photographed to interrupt the illumination from the electronic flash whenever a proper exposure is reached while simultaneously causing the shutter of the camera to be closed. A manual illumination control mode which is widely used establishes a diaphragm of the camera in accordance with a guide number and a distance to an object being photographed to control the electronic flash. Certain electronic flashes are also available in which modified guide numbers can be used during the manual mode.

When an electronic flash having the capability to be operated in any of these illumination modes is used, a desired mode can be selected depending on the type of camera on which it is mounted or as the user desires, by a switching means provided on the electronic flash in the form of a rotary or sliding switch. As the switch is operated, an indicator table provided on the back of the electronic flash which gives a list of diaphragm values against distances to an object being photographed as well as a film speed indicator table are modified in accordance with the switch setting. Such indicator tables are only necessary during the manual mode, but are unnecessary when the TTL or a usual automatic control mode is chosen. When these modes are chosen, proper exposure is automatically assured without the use of such indicator tables. Nevertheless, if these indicator tables remain exposed, a user may think they should be used. Hence, it is desirable that such indicator tables be capable of being hidden from the view of the user during operation in the automatic modes.

Conversely during the manual illumination control mode, the diaphragm value and film speed indicator tables are shifted in accordance with a different set of guide numbers, so that it is also desirable that indications other than those associated with a selected guide number be hidden.

SUMMARY OF THE INVENTION

It is an object of the invention to provide an electronic flash including a frame having an indication panel therein for displaying diaphragm value calculation and indication means which panel can be selectively disposed in alternate positions to expose either its front or rear surface to thereby permit a selected indication associated with a particular illumination control mode utilized during a photography operation to be rendered visible while indications which need not be displayed for particular operation are hidden.

In accordance with the invention, the indication panel which displays diaphragm values as calculated in accordance with a distance to an object being photographed is hidden during TTL automatic illumination control modes to avoid indications which a user might feel compelled to use when the same is unnecessary. When an electronic flash is provided with different series of guide numbers, a minimum area of the indication panel associated with a particular mode selected is rendered visible while other areas are hidden to avoid any misleading indication. In addition, the manner of mounting the indication panel on the frame enables an automatic switching of the illumination control mode of the electronic flash to simplify the switching operation and prevent inadvertent operation.

DESCRIPTION OF PREFERRED EMBODIMENT

Referring to the drawings, an embodiment of the invention will be described which is constructed for automatic illumination control of an electronic flash capable of TTL exposure control and having a series of guide numbers. Specifically, when the electronic flash of this embodiment is mounted on a camera including means for TTL photometry, the illumination from the electronic flash is interrupted in response to an illumination control signal produced by a photometric element within the electronic flash whenever operation is defined for an automatic control mode. When the mode selection switch is positioned for the manual mode, the electronic flash fully cycles through the illumination process. Alternatively, when the electronic flash is established in a manual mode while an associated camera is arranged to provide a TTL photometric signal, the illumination from the electronic flash is automatically interrupted by an illumination control signal produced by photometric element within camera.

Figure 3:
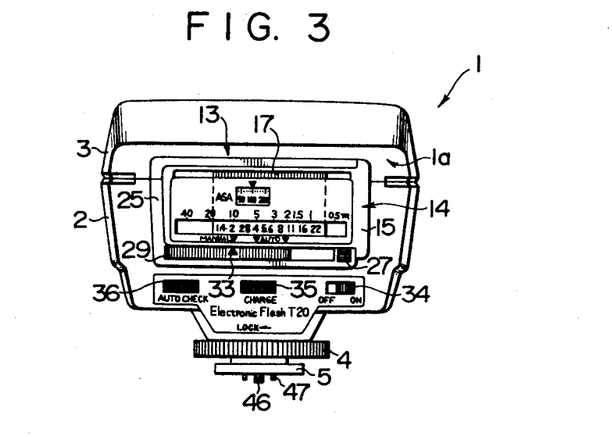
FIG. 3 is a rear view of the electronic flash shown in FIG. 1.
Figure 4:
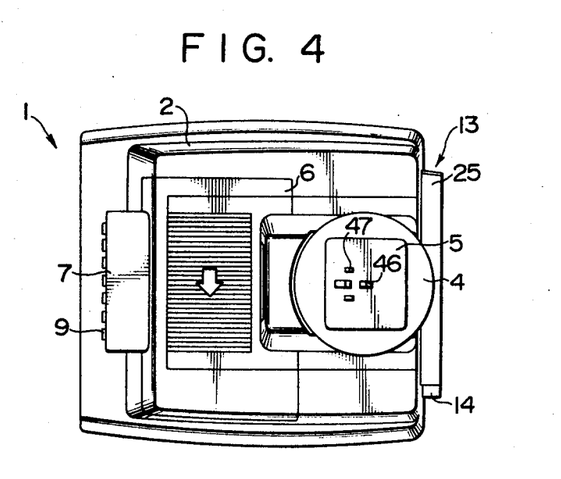
FIG. 4 is a bottom view of the electronic flash shown in FIG. 1.
Figure 5:
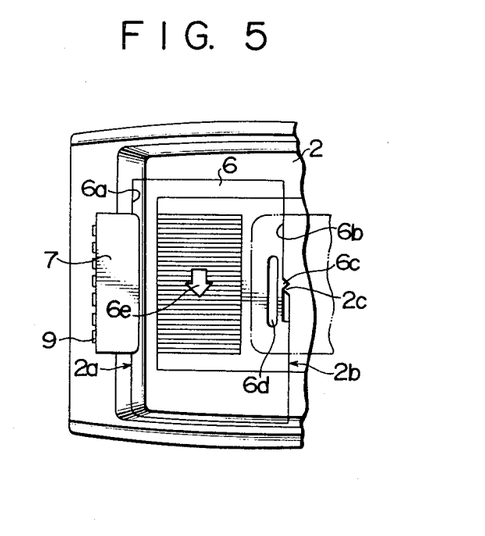
FIG. 5 is a fragmentary bottom view, indicating a battery receiving housing and its associated lid of the electronic flash shown in FIG. 1.

Referring to FIGS. 1 to 4, there is shown an electronic flash according to one embodiment of the invention. The electronic flash includes body 1 comprising a box-like lower frame 2, and an upper frame 3 in the form of a top cover which is secured to lower frame 2 by screws (not numbered). Disposed on the bottom, rear of lower frame 2 is a synchro terminal 40 and knob 4 carrying shoe 5 which is used in mounting the electronic flash to the camera. Lid 6 (see FIGS. 2 and 4) is disposed forward at the bottom of lower frame 2 and can be slidably inserted into or from the lower frame 2 as indicated in FIG. 5 to close a battery casing formed. When lid 6 is withdrawn in a direction indicated by arrow 6e, it opens the battery casing while the latter is closed when the lid is inserted in the opposite direction. To permit such a sliding movement, the lower frame 2 is formed with V-groove 2a and stepped groove 2b which are engaged by chevron-shaped edges 6a, 6b of lid 6. When inserted, the lid 6 is locked against withdrawal in the downward direction by being held between the grooves 2a, 2b. Edge 6b is formed with lengthwise elongate slot 6d (FIG. 5) intermediate its length, and is also formed with chevron-shaped clicking projection 6c which is situated along edge 6b at a position corresponding to the center of slot 6d. By forming slot 6d in lid 6, some resilience is imparted to projection 6c, which therefore can move past a similarly formed chevron-shaped clicking projection 2c which is provided on stepped groove 2b can be locked thereby. The clicking projections 6c and 2c thus function in combination as a click stop mechanism which prevents withdrawal of lid 6 in the direction of arrow 6e.

Figure 1:
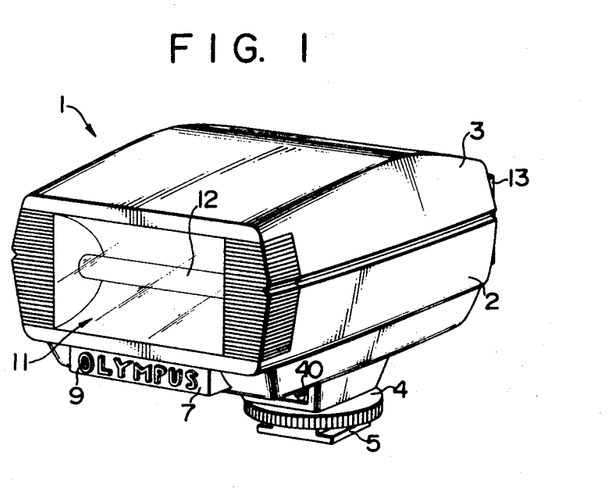
FIG. 1 is a perspective view of an electronic flash according to one embodiment of the invention.
Figure 6:
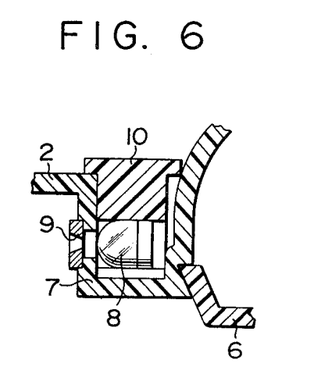
FIG. 6 is an enlarged longitudinal section showing the disposition of a photometric, light receiving element provided in the electronic flash of FIG. 1.
Figure 7:
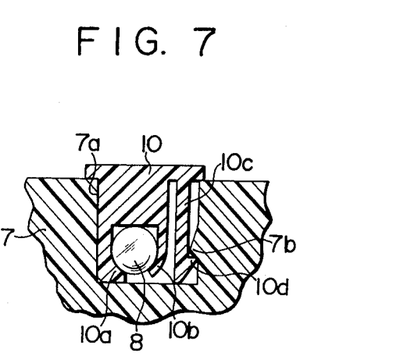
FIG. 7 is an enlarged transverse section of the photometric element shown in FIG. 6.

As shown in FIG. 1, label plate 7 is provided on the bottom of the front surface of lower frame 2 and carries the trademark "OLYMPUS" of the present assignee. The letter "O" is centrally apertured to provide window 9 for passing light to photometric, light receiving element 8 best shown in FIG. 6. Element 8 is mounted within holding member 10 so that its light active area is disposed in opposing relationship to window 9. The holding member 10 is formed of a material such as plastic or the like having a certain degree of resilience and is formed with a pair of tabs 10a, 10b which resiliently mount light receiving element 8 as shown (FIG. 7). It is also formed with tab 10c which extends in juxtaposition with tab 10b. The tab 10c is provided with step 10d adjacent to its free end to engage a burr-shaped projection 7b formed on the inner wall of opening 7a of label plate 7 to thus provide a detent to prevent withdrawal of holding member 10.

Figure 2:
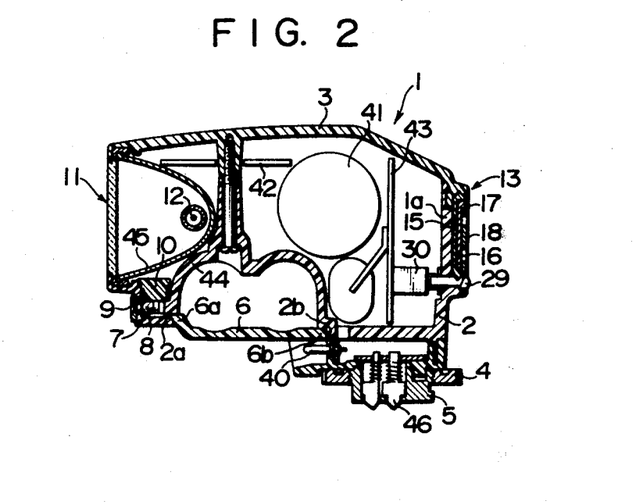
FIG. 2 is a cross section of the electronic flash shown in FIG. 1.

As shown in FIGS. 1 and 2, the front of body 1 is provided with illumination emitting window 11. A flash discharge tube 12 is disposed within emitting window 11. FIGS. 2 to 4 also show other conventional components usually contained in an electronic flash, including main capacitor 41, printed circuit board 42 printed circuit board 43, having a mode selection switch 30 mounted thereon, battery casing 44, reflecting mirror 45, synchro trigger terminal 46, and terminal 47 to which an illumination control signal is transmitted from the camera.

Figure 8:
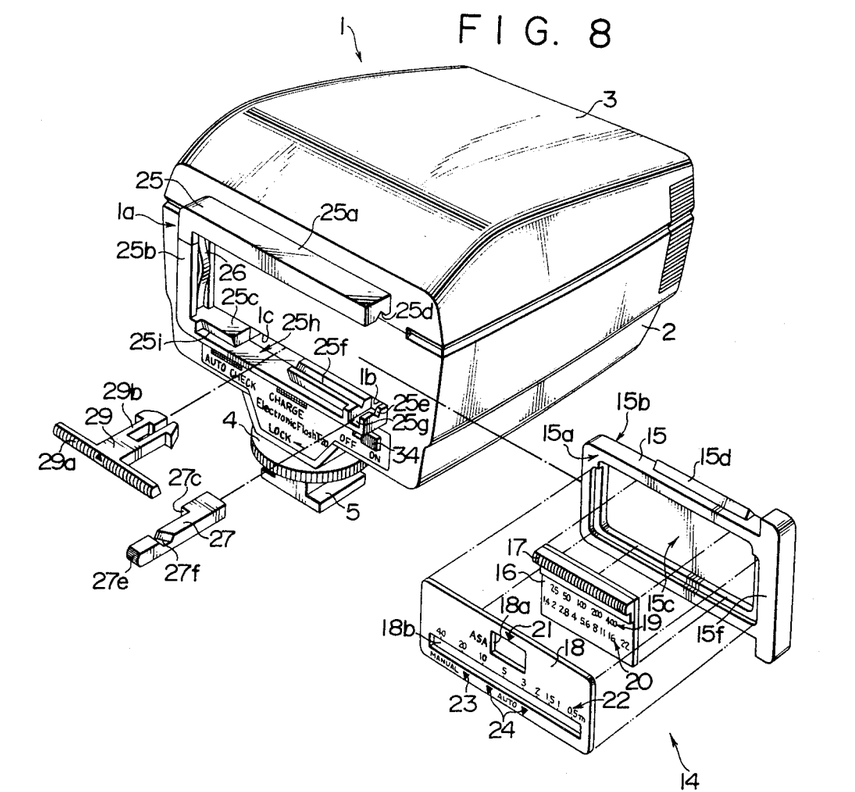
FIG. 8 is a partly exploded, perspective view of an indication panel which is provided on the electronic flash of FIG. 1.

FIG. 8 is an exploded, perspective view of a calculation and indication assembly which is used with the electronic flash according to the present invention. The assembly is mounted on rear wall 1a of body 1 (see FIG. 3). Assembly 13 comprises indication panel 14 which is elongate in the transverse direction, and frame 25 which is used to mount panel 14 on body 1.

Figure 9:
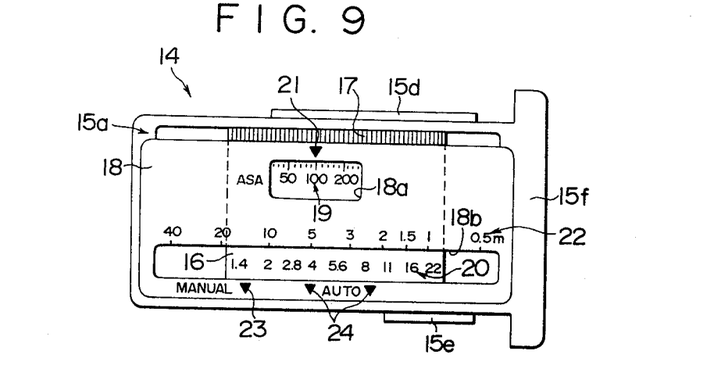
FIG. 9 is a front view of an indication panel shown in FIG. 8.

Indicator panel 14 comprises an assembly of frame plate 15, sliding plate 16 and designation plate 18. Frame plate 15 is formed with transversely elongate recess 15c in its front side 15a in which sliding plate 16 having operating member 17 secured on its top and on the front side thereof is received. Designation plate 18 is fitted into recess 15c on the front side of sliding plate 16 until it becomes flush with front surface 15a of frame plate 15. By operating the member 17, sliding plate 16 can be freely moved within recess 15c in the transverse direction. Sliding plate 16 is provided with film speed scale 19 and diaphragm value scale 20 while designation plate 18 is formed with film speed indicator window 18a and diaphragm value indicator window 18b which are vertically spaced from each other. A film speed index 21 is marked along the upper edge of indicator window 18a at a central position while distance scale 22 is marked along the upper edge of window 18b. Additionally, manual mode indices 23 and auto mode index 24 are marked along the lower edge of window 18b. When member 17 is displaced to position digits of the film speed scale 19 within window 18a and in alignment with index 21 to select a desired film speed as indicated in FIG. 9; the correspondence between a diaphragm value and a distance to an object being photographed during the manual illumination control mode can be determined by the relative position of diaphragm value scale 20, exposed through window 18b, and distance scale 22 marked on designation plate 18. In this manner, indicator panel 14 of the invention calculates and displays diaphragm values in accordance with a guide number being employed during a full illumination cycle of the electronic flash.

Figure 10:
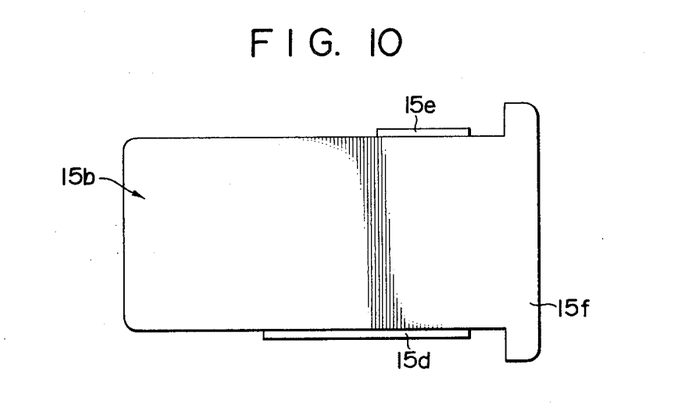
FIG. 10 is a rear view of the indication panel of FIG. 9.

The rear side 15b of frame plate 15 is a flat, blank surface as indicated in FIG. 10. The lower edge of rear surface 15b is partly formed with guide rib 15d (FIG. 8) which is chevron-shaped in cross section. It should be noted that the view of FIG. 10 has been rotated with respect to FIGS. 8 and 9 to illustrate the manner in which frame plate 15 is inserted for a manual mode of operation i.e. operated by the TTL photometry in the camera. Rib 15d is formed on a side of lower edge which is located toward rear surface 15b. In a similar manner, the upper edge of rear surface 15b is partly formed with guide rib 15e which is chevron-shaped in cross section and is similarly located on a side of the upper edge located toward rear surface 15b. The right-hand end faces of these guide ribs 15d, 15e are located at a given distance from the left-hand end face of grip 15f to be described later, which is sufficient to permit locking member 27 (which will be described later in connection with FIGS. 11 and 12) to extend therethrough. It is to be noted that rib 15d has a length which is substantially twice that of rib 15e, so that its left-hand end face will abut against the right-hand end face of connector 29b (see FIG. 11) of mode selection member 29 to place it in its manual mode position when indicator panel 14 is mounted on frame 25 with rib 15d down as shown in FIG. 10. Thus rib 15d will drive connector 29b to its manual mode position so the same may be automatically operated by the photometry in a TTL camera. On the other hand, the left-hand end face of rib 15e is located to prevent its projection out of V-groove 25f (see FIG. 11) when indicator panel 14 is mounted on frame 25 so to allow for the selection of any mode of operation. In this manner, rib 15d also functions as switching means which automatically switches an illumination control mode of the electronic flash as indicator panel 14 is mounted on frame 25.

The right-hand end of frame plate 15 is formed as grip 15f having both upper and lower projections. When indicator panel 14 is mounted on frame 25, grip 15f constitute an overall frame for the calculation and indication assembly 13 together with frame 25.

Figures 11, 12:
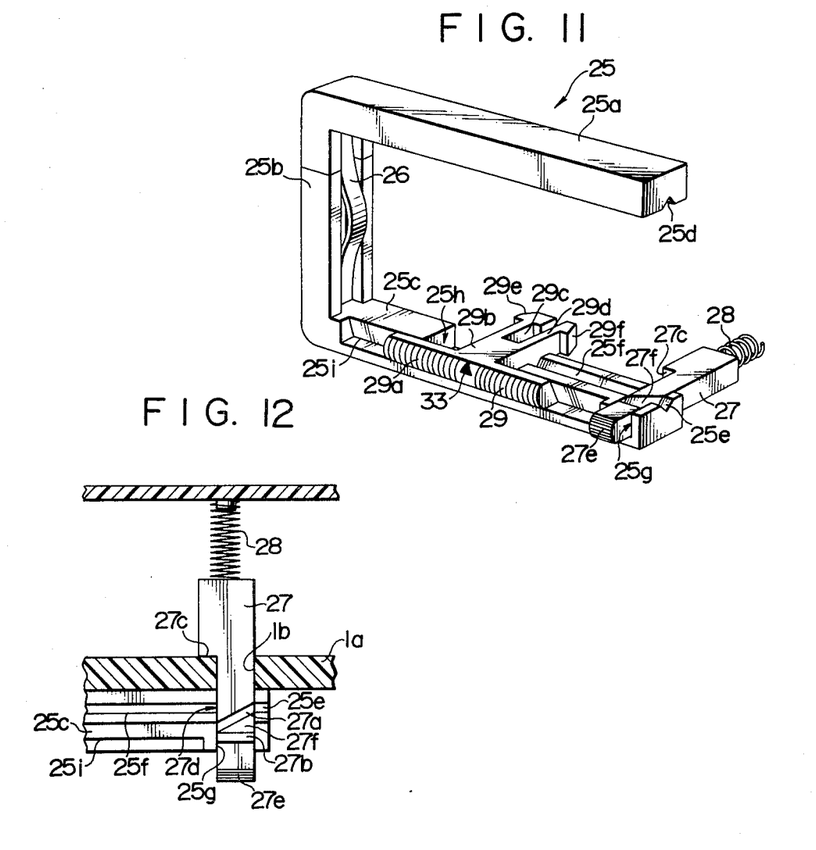
FIG. 11 is a perspective view of a frame in which the indicator panel of FIG. 8 is mounted.
FIG. 12 is a top view of a locking member associated with the frame of FIG. 11.
Figure 13:
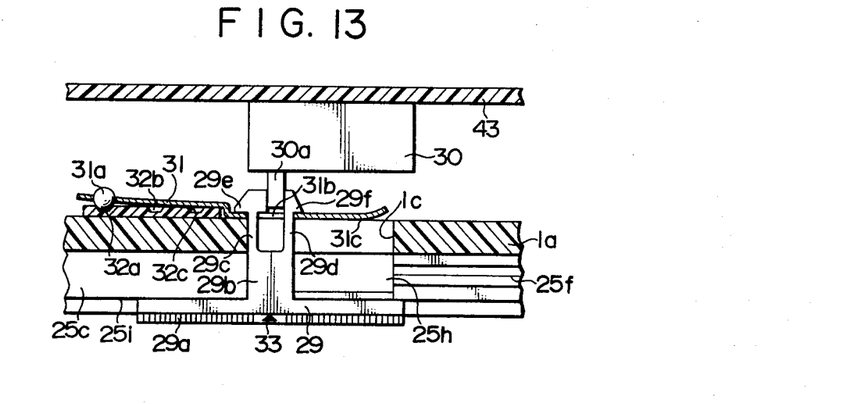
FIG. 13 is a plan view of a mode switching member associated with the frame of FIG. 11.
Figure 16:
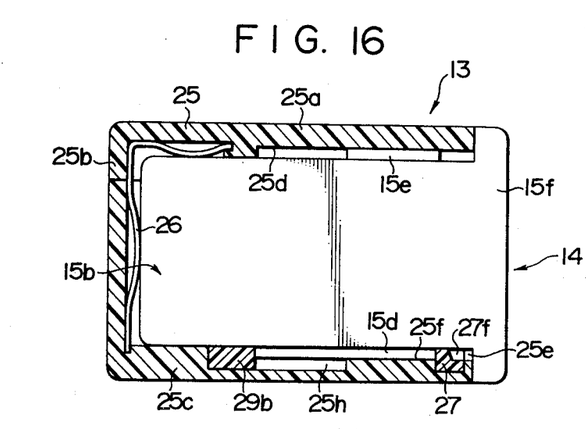
FIG. 16 is a cross section of the indication panel of FIG. 9 as mounted in the frame shown in FIG. 11.

As shown in FIGS. 8 and 11, frame 25 includes upper frame portion 25a, left-hand frame portion 25b and lower frame portion 25c, and is secured to or integrally formed with rear wall 1a of frame 1. Upper frame portion 25a is formed with V-groove 25d in which guide rib 15d or 15e fits to guide a sliding movement of indicator panel 14. Leaf spring 26 is disposed along the left-hand portion of the lower surface of upper frame portion 25a and the inner surface of left-hand frame portion 25b for biasing and holding indicator panel 14 as shown in FIG. 16. When indicator panel 14 is mounted, the spring acts to urge indicator panel 14 outward, thus preventing a rattling thereof.

Returning to FIGS. 8 and 11, V-groove 25e which guides indicator panel 14 is formed in the upper surface of lower frame portion 25c, and is contiguous with notch 25g in which locking member 27 slidably fits in a manner to permit its sliding movement in the fore-and-aft direction. V-groove 25f is formed in lower frame portion 25c, being continuous with notch 25g. The purpose of locking member 27 is to lock indicator panel 14 to frame 25. Locking member 27 is disposed inside the wall 1a by passing through opening 1b formed in rear wall 1a of body 1. As shown in FIG. 12, locking member 27 is normally biased by spring 28 to project forwardly, but the resulting movement is blocked by the abutment of step 27c which is formed intermediate its length against the inner surface of rear wall 1a. Toward its projecting end, locking member 27 is formed with sliding groove 27f which is defined by skewed, bevelled surface 27a and another bevelled surface 27b which extend in a direction skewed or oblique to and perpendicular to the sliding direction of member 27, respectively. The purpose of sliding groove 27f is to provide a communication between V-grooves 25f and 25e when indicator panel 14 is to be mounted on frame 25. Specifically, skewed surface 27a is formed to extend from the right-hand side to the left-hand side of member 27 in a manner to extend downward to the left, as viewed in FIG. 12, at a position inwardly removed from the end of member 27. On the other hand, bevelled surface 27b is formed toward the end of member 27 and has an angle of inclination as that of the bevelled surfaces of V-grooves 25f and 25e. Sliding groove 27f defined by both bevelled surfaces 27a, 27b has a depth which is the same as the depth of V-grooves 25f, 25e. Thus, groove 27f is trapezoidal in configuration, presenting an increased opening toward V-groove 25e and presenting a commensurate opening toward V-groove 25f.

When indicator panel 14 is inserted into frame 25, bevelled surface 27a is urged by the forward end face of rib 15d or 15e which is disposed within V-groove 25e to cause a retracting movement of locking member 27 until sliding groove 27f is aligned with V-grooves 25e, 25f, thus permitting an advance of either rib 15d or 15e into V-groove 25f. When either rib 15d or 15e has moved past groove 27f to be located within V-groove 25f, the bias acting on locking member 27 causes it to move forward, interrupting a communication between V-grooves 25f, 25e.

Figure 14:
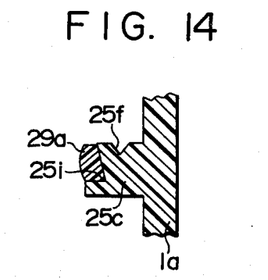
FIG. 14 is a cross section of the switching member shown in FIG. 13.
Figure 15:
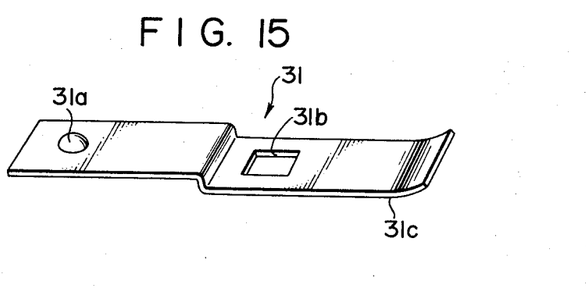
FIG. 15 is a perspective view of a leaf spring used in mounting the switching member of FIG. 13.

The projecting end of locking member 27 is formed as unlocking element 27e for indicator panel 14. The left-hand side face of locking member 27 provides locking surface 27d for indicator panel 14. Lower frame portion 25c is centrally formed with notch 25h (see FIGS. 8 and 11), and is also formed with V-groove 25i for guiding purpose which is cut into the front and upper surfaces of lower frame portion 25c. Mode selection member 29 has operator 29a (see FIG. 14) which slidably fits in V-groove 25i. In addition to operator 29a, mode selection member 29 includes connector 29b which is generally T-shaped and which extends through opening 1c formed in rear wall 1a and extends into body 1. Connector 29b is connected with changeover knob 30a of mode changeover switch 30 which is disposed within the electronic flash. The front surface of operator 29a is formed as a knurled surface which is centrally marked with index 33 which can be brought into alignment with manual mode index 23 or automatic mode index 24 on indicator panel 14 (see FIG. 9). The forward end of connector 29b which extends into body 1 is formed with a pair of projections 29c, 29d each of which is formed with detent piece 29e, 29f, respectively, on their outer surface. These projections 29c, 29d hold changeover knob 30a therebetween. Selection number 29 is mounted on lower frame portion 25c in a manner to prevent its withdrawal when projections 29c, 29d are inserted into central opening 31b formed in leaf spring 31 carrying click stop ball 31a in its one end (see FIG. 15), thus locking detent pieces 29e, 29f against the edges of opening 31b, respectively.

The other end of leaf spring 31 is gently curved to a side which represents the interior so that a region thereof which bears against the inner surface of rear wall 1a provides fulcrum 31c for leaf spring 31. The bending stress which is produced in leaf spring 31 in the region located between fulcrum 31c and ball 31a imparts an inwardly directed tension to selection member 29 which cooperates with V-groove 25i to be held tightly against frame 25. The resilience of leaf spring 31 permits ball 31a to be engaged with one of click holes 32a, 32b or 32c formed in the inner side of rear wall 1a, thus maintaining changeover knob 30a at a selected position. Specifically, when ball 31a engages hole 32a, switch 30 establishes a manual mode for the electrical circuit of the electronic flash, bringing index 33 marked on selection member 29 into alignment with manual mode index 23 (see FIG. 9) marked on indicator panel 14. When ball 31a is engaged with either hole 32b, 32c, switch 30 establishes an automatic mode for the electrical circuit of the electronic flash, bringing index 33 into alignment with automatic mode index 24 (see FIG. 9) marked on indicator panel 14 mounted.

As shown in FIG. 3, the electronic flash includes power switch 34 which is located toward the right-hand side on the bottom of rear wall 1a. It also includes window 35 which is formed in the central portion of the bottom of rear wall 1a which is associated with a lamp for indicating the completion of a charging operation of the main capacitor, and another window 35 to the left-hand side of the bottom which is associated with another lamp for indicating the completion of a flashlight illumination.

The electronic flash of the invention is adapted to be mounted on a photographic camera of TTL photometry type. The operation of the electronic flash depends on the choice of a TTL automatic control mode or other modes such as usual automatic or manual mode inasmuch as the manner of mounting indicator table 14 differs between these modes.

EXAMPLE 1

The electronic flash is mounted on a camera of this type for which a TTL automatic control mode is established.

In this instance, indicator table 14 is mounted on frame 25 so that its rear side 15b is exposed externally. Specifically, indicator table 14 is inserted into frame 25 from the right-hand end thereof so that its rear side 15b is visible, with upper and lower guide ribs 15e, 15d fitted into V-grooves 25d, 25e, respectively, of frame 25. As indicator table 14 is pushed inward until the left-hand end of lower rib 15d bears against bevelled surface 27a of locking member 27, the latter slides rearwardly, whereby rib 15d is permitted to move into V-groove 25f (see FIG. 12). The left-hand end face of rib 15d moves past V-groove 25f to advance into notch 25h where it abuts against the right-hand side face of connector 29b of selection member 29, thus causing the latter to move to the left until the left-hand side face of connector 29b bears against the left-hand, inner end face of notch 25h (see FIG. 16). On the other hand, the left-hand side of indicator table 14 bears against leaf spring 16, but is further pushed inward against the resilience thereof. In this manner, the right-hand end of rib 15d can be moved into V-groove 25f, whereupon locking member 27 is returned by the resilience of spring 28 to its original position in which detent stop 27c bears against the inner surface of rear wall 1a. Hence, indicator table 14 may be released while preventing its withdrawal from frame 25 since the right-hand end face of rib 15d abuts against locking surface 27d of locking member 27. Because leaf spring 26 is charged under this condition to impart its resilience to indicator table 14 through the top portion thereof, as indicated in FIG. 16, a rattling of indicator table 14 is prevented.

When indicator table 14 is mounted on frame 25 so that its rear side 15b is visible, selection member 29 is shifted to the left automatically, whereby changeover knob 30a slides to a manual mode position to change switch 30, so that the illumination of the electronic flash is controlled automatically in accordance with an illumination control signal from the camera during the TTL automatic control mode.

EXAMPLE 2

The electronic flash is mounted on a camera of the TTL photometry type when an automatic or a manual mode of operation is established or alternatively is mounted on a camera having an automatic and a manual mode.

In this instance, indicator table 14 is mounted on frame 25 so that its front side 15a carrying sliding plate 16 and designation plate 18 thereon is externally exposed.

When indicator table 14 is inserted into frame 25 with its front side 15a externally visible, guide ribs 15d and 15e can be fitted into V-grooves 25d and 25e, respectively, of frame 25. As indicator table 14 is pushed inward until the left-hand end of rib 15e bears against bevelled surface 27a of locking member 27 and is thereafter further driven to the left, locking member 27 slides rearwardly to permit rib 15e to move into V-groove 25f. As it is further pushed inward, the left-hand side face of indicator table 14 bears against leaf spring 16. Indicator table 14 is then further pushed inward slightly through a small stroke against the resilience of spring 26, whereupon the right-hand end of rib 15e completely enters V-groove 25f. Hence, the resilience of spring 28 returns locking member 27 to its original position in which detent step 27c bears against the inner surface of rear wall 1a. Thus, indicator table panel 14 can be released while preventing a withdrawal thereof from frame 25 inasmuch as the right-hand end face of rib 15e abuts against locking surface 27d of locking member 27. Leaf spring 26 is charged under this condition, and its resilience is imparted to indicator table 14 through its top portion, thus preventing a rattling of indicator panel 14.

When indicator panel 14 is mounted on frame 25 so that its front side 15a is externally visible, rib 15e cannot project out of V-groove 25f into notch 25h, whereby selection member 29 is freely slidable within notch 25h. This permits index 33 to be brought into alignment with either manual mode index 23 or automatic mode indices 24. When index 33 is aligned with automatic mode indices 24, selection member 29 changes switch 30 so that the illumination from the electronic flash is controlled by an illumination control signal which is produced by photometric element 8 disposed within the electronic flash. When index 33 is aligned with manual mode index 23, selection member 29 changes switch 30 so that the electronic flash fully goes through its illumination cycle, thus achieving its manual mode.

Indicator panel 14 can be removed by pressing unlock member 27e inward to retract locking surface 27b rearwardly, providing a communication between sliding groove 27f and V-groove 25f. The resilience of charged leaf spring 26 causes the right-hand end face of ribs 15d, 15e to move into sliding groove 27f, so that indicator panel 14 is no longer locked and can be manually withdrawn in a facilitated manner.

When the electronic flash is mounted on a camera of TTL photometric type for which a TTL automatic control mode is established, no difficulty is experienced in practical use by bringing index 33 on selection member 29 into alignment with manual mode index 23 to enable a TTL automatic mode or into alignment with automatic mode index 24 to enable a usual automatic mode if indicator panel 14 is mounted on frame 25 so that its front side 15a is externally visible. When the electronic flash is mounted on a camera which is not of TTL photometry type, a manual mode is established if indicator panel 14 is mounted on frame 25 so that its rear side 15b is externally visible, presenting no difficulty in practical use even though a calculation of diaphragm values is impossible.

While an embodiment of the invention has been described, it should be understood that the invention is not limited in its use to an electronic flash of an automatic illumination control type, but equally applicable to an electronic flash having two different illumination modes which utilizes different values of guide numbers. In this instance, means for calculating and indicating distance and diaphragm value associated with the respective values of guide numbers may be provided on the front and the rear side of indicator panel 14.

While a guide rib on the indicator panel is utilized as means for automatically establishing a given illumination mode when the indicator panel is mounted on its frame, such means may be replaced by other mechanical means such as projection or electrical means such as electrical contact which is separate from the guide rib.

What is claimed is:

1. An improved flash having a selectively energizable source of illumination, means for controlling said source of illumination according to a plurality of operational modes including an automatic control mode and a manual control mode and a housing enclosing said source of illumination and said means for controlling, wherein the improvement comprises, frame means mounted upon an outer surface of said housing, and indicator panel means removably mounted within said frame means, said indicator panel means having front and rear surfaces and being selectively mounted within said frame means to externally expose selectively either said front or rear surface thereof, one of said front and rear surfaces of said indicator panel means having means for calculating a diaphragm value disposed thereon.

2. The improved electronic flash according to claim 1 wherein said indicator panel means is in the form of a rectangular plate having upper and lower edges, said indicator panel means having guide ribs mounted to said upper and lower edges for facilitating mounting within said frame means.

3. The improved electronic flash according to claim 1 wherein said indicator panel means includes switching means mounted upon a peripheral surface thereof for automatically establishing one of said plurality of selectable illumination modes when said indicator panel means is mounted within said frame means.

4. The improved electronic flash according to claim 3 wherein said indicator panel means is in the form of a rectangular plate having upper and lower edges and said switching means includes guide ribs formed on said upper and lower edges of said rectangular plate means said guide ribs having different lengths.

5. The improved electronic flash according to claim 3 additionally comprising illumination mode changeover switch means for selectively changing said illumination control mode and means for automatically changing said switch means to select a predetermined control mode when said indicator panel means is mounted within said frame means to expose a selected one of its front and rear surfaces.

6. The improved electronic flash according to claim 5 wherein said frame means includes a mode selection member mounted on said frame means and coupled to said changeover switch means, said indicator panel means being operable to place said illumination mode changeover switch in a condition to select said predetermined control mode through said mode selection member mounted on said frame means.

7. The improved electronic flash according to claim 3 wherein said another one of said front and rear surfaces of said indicator panel means exhibits a blank surface area, said one of said plurality of selectable illumination modes of the electronic flash being automatically established when said indicator panel means is mounted within said frame means with said another one of said front and rear surfaces externally exposed.

8. The improved electronic flash according to claim 1 wherein said means for calculating comprises sliding plate means having a film speed scale indicia and a diaphragm value scale indicia disposed thereon, a recess formed centrally in the indicator panel for receiving the sliding plate means, and a designation plate means having apertures therein for exposing said film speed scale indicia and said diaphragm value scale indicia, said designation plate means being provided with distance scale indicia disposed to cooperate with said diaphragm value scale indicia.

9. The improved electronic flash according to claim 1 wherein said frame means includes locking member means, for locking said indicator panel means within said frame means.

10. The improved electronic flash according to claim 9 wherein said locking member means takes the form of a pillar having a rectangular cross-section and a sliding groove, said sliding groove being defined by a first bevelled surface skewed with respect to the length of said pillar and a second bevelled surface extending in a direction perpendicular to the length of said pillar, said locking member means being slidably fitted in a notch formed in said frame means and spring biased to project outwardly, said indicator panel means having a guide rib thereon for bearing against said first bevelled surface as indicator panel means is mounted within said frame means causing said locking member means to displace into said frame means to permit mounting of said indicator panel means until said guide rib is displaced past said locking member means allowing said locking member means to return to an original position locking said indicator panel means.

11. The improved electronic flash according to claim 1 wherein said indicator panel means takes the form of a rectangular plate having guide ribs disposed upon the upper and lower edges thereof, and said frame means exhibiting a channel-shape having guide grooves formed therein for engaging said guide ribs of said indicator panel means.

12. The improved electronic flash according to claim 1 additionally comprising an illumination mode changeover switch means disposed within said housing for selectively changing said illumination control mode, and mode selection member means disposed in said frame means for operating said changeover switch means.

13. The improved electronic flash according to claim 12 wherein said mode selection member includes an operator means slidably disposed in said frame means and a connector extending from said operator means through said housing of the electronic flash, said connector being connected with the mode changeover switch means.

14. The improved electronic flash according to claim 12 wherein said mode selection member is selectively positioned by said indicator panel means when the same is mounted within said frame means.

15. The improved electronic flash according to claim 1 wherein said frame means includes a leaf spring disposed therein to maintain said indicator panel means in a properly mounted position within said frame means.

* * * * *

UNITED STATES PATENT AND TRADEMARK OFFICE
CERTIFICATE OF CORRECTION

PATENT NO. : 4,271,376
DATED : June 2, 1981
INVENTOR(S) : Mitsuo Kawazoe

It is certified that error appears in the above—identified patent and that said Letters Patent is hereby corrected as shown below:

Column 1, line 43, after "any" insert --one--.

Column 1, line 61, change "if" to --of--.

Column 3, line 17, after "by" insert --a--.

Column 4, line 37, change "indices" to --index--; and change "index" to --indices--.

Signed and Sealed this

Twenty-fifth Day of August 1981

[SEAL]

Attest:

Attesting Officer

GERALD J. MOSSINGHOFF

Commissioner of Patents and Trademarks